US012490680B2

(12) United States Patent
Duquesne et al.

(10) Patent No.: US 12,490,680 B2
(45) Date of Patent: Dec. 9, 2025

(54) DEFLECTOR FOR FAN HOUSING OF CLEANING SYSTEM OF COMBINE HARVESTER

(71) Applicant: CNH Industrial America LLC, New Holland, PA (US)

(72) Inventors: Frank R. G. Duquesne, Zwevegem (BE); Jonathan E. Ricketts, Coal Valley, IL (US); Curtis Frederick Hillen, Lititz, PA (US); Michiel Vanderstichele, Merkem (BE); Bart Moutton, Gits (BE)

(73) Assignee: CNH Industrial America LLC, New Holland, PA (US)

( * ) Notice: Subject to any disclaimer, the term of this patent is extended or adjusted under 35 U.S.C. 154(b) by 472 days.

(21) Appl. No.: 18/021,961

(22) PCT Filed: Aug. 20, 2021

(86) PCT No.: PCT/US2021/046850
§ 371 (c)(1),
(2) Date: Feb. 17, 2023

(87) PCT Pub. No.: WO2022/040503
PCT Pub. Date: Feb. 24, 2022

(65) Prior Publication Data
US 2023/0389479 A1    Dec. 7, 2023

Related U.S. Application Data

(60) Provisional application No. 63/068,139, filed on Aug. 20, 2020.

(51) Int. Cl.
*A01F 12/44*    (2006.01)

(52) U.S. Cl.
CPC .................. *A01F 12/444* (2013.01)

(58) Field of Classification Search
CPC ..... A01D 75/282; A01F 12/44; A01F 12/444; A01F 12/48
See application file for complete search history.

(56) References Cited

U.S. PATENT DOCUMENTS

| 1,584,790 A | 5/1926 | Mller |
| 1,922,986 A | 8/1933 | Stith |

(Continued)

FOREIGN PATENT DOCUMENTS

EP    0768025 A1    4/1997

OTHER PUBLICATIONS

International Search Report and Written Opinion for PCT Application No. PCT/US2021/046850 dated Dec. 2, 2021 (12 pages).

*Primary Examiner* — Joseph M Rocca
*Assistant Examiner* — Robert E Pezzuto
(74) *Attorney, Agent, or Firm* — Buchanan Ingersoll & Rooney PC (57) ABSTRACT

A fan assembly for a cleaning system of a combine harvester includes a housing having a plurality of interconnected walls, the interconnected walls defining least one inlet opening through which air is delivered into the housing, and at least one outlet opening through which air is exhausted from the housing. A deflector is positioned either at or adjacent the outlet opening, the deflector being configured to affect a flow of air across a width dimension W of the outlet opening. The deflector may be a single, unitary body or the deflector may include a plurality of independently rotatably panels.

20 Claims, 14 Drawing Sheets

(56) References Cited

U.S. PATENT DOCUMENTS

| | | | |
|---|---|---|---|
| 2,682,951 | A | 7/1954 | Hamburg |
| 2,849,118 | A * | 8/1958 | Ashton ................ A01F 12/444 209/318 |
| 4,303,079 | A * | 12/1981 | Claas .................... A01F 12/444 56/16.5 |
| 5,428,945 | A | 7/1995 | von Allwörden et al. |
| 5,558,576 | A | 9/1996 | Meyers |
| 5,624,315 | A | 4/1997 | Jonckheere |
| 6,863,605 | B2 | 3/2005 | Gryspeerdt et al. |
| 7,841,044 | B1 * | 11/2010 | Weihl .................... A01G 20/47 15/418 |
| 9,986,688 | B2 | 6/2018 | Stahl |
| 2004/0043804 | A1 * | 3/2004 | Redekop ................ A01F 12/40 460/112 |
| 2018/0343805 | A1 | 12/2018 | Faulkner et al. |
| 2020/0137959 | A1 | 5/2020 | Ricketts |

* cited by examiner

DEFLECTOR FOR FAN HOUSING OF CLEANING SYSTEM OF COMBINE HARVESTER

FIELD OF THE INVENTION

The present invention relates to a fan housing, and a deflector therefor, for the cleaning system of agricultural equipment, such as a combine harvester.

BACKGROUND OF THE INVENTION

As is described in U.S. Pat. Nos. 8,221,064 and 10,561,069 to CNH America LLC, which are each incorporated by reference in their entirety and for all purposes, a cleaning system for a combine harvester includes a fan assembly that is configured to blow air through reciprocating sieves to carry lighter elements of material other than grain (MOG) or chaff away.

Transverse or cross-flow fans of various designs have been advantageously employed with agricultural combines to provide the air that is blown upwardly and rearwardly through the sieves to carry the chaff away from the grain and tailings deposited onto the cleaning system sieves. Transverse fans are useful in combine cleaning systems because such fans can produce a wide stream of air that can be directed upwardly toward the cleaning sieves of the combine cleaning systems but require relatively little space. Such fans, in typical agricultural combines, are disposed such that their air outputs are below the sieves of the cleaning system.

One problem with long and wide transverse fans is that the air blowing through the fan housing will receive air through its inlet in a uniform manner, however, as the air stream enters the fan housing, the air stream converges towards the center of the housing and creates a significantly stronger airstream in the center of the housing as compared with the sides of the housing. In other words, the air can be unevenly distributed along the width dimension 'W' of the fan (see FIG. 3A) as it travels from the inlet to the outlet of the fan. Moreover, in a situation where the crop mat becomes uneven across the width of the sieves, the air within the fan housing will typically follow the path of least resistance, namely, toward the unobstructed portion of the sieves. This may be referred to in the art as a blowout condition.

It would be desirable to provide uniform distribution of air across the entire width of the fan assembly in order to improve cleaning efficiency, crop processing, and either limit or prevent a blowout condition. It would also be desirable to tailor the distribution of air between multiple outlets in the fan housing.

SUMMARY OF THE INVENTION

According to one aspect of the invention, a fan assembly for a cleaning system of a combine harvester comprises:
a housing comprising a plurality of interconnected walls, the interconnected walls defining least one inlet opening through which air is delivered into the housing, and at least one outlet opening through which air is exhausted from the housing; and
a deflector positioned either at or adjacent the outlet opening, the deflector being configured to affect a flow of air across a width dimension W of the outlet opening.

According to one aspect of the invention, a fan assembly for a cleaning system of a combine harvester comprises:
a housing comprising a plurality of interconnected walls, the interconnected walls defining least one inlet opening through which air is delivered into the housing, and first and second outlet openings through which air is exhausted from the housing;
a first deflector positioned either at or adjacent the first outlet opening, the deflector being configured to affect a flow of air across a width dimension W of the first outlet opening; and
a second deflector positioned either at or adjacent the second outlet opening, the second deflector being configured to affect a flow of air across a width dimension W of the second outlet opening.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

It should be appreciated that, while the following discussion will be directed principally to transverse fan assembly embodiments as employed in such a combine harvester, the transverse fan assemblies of the present invention are not limited to use in such harvesters, but could equally as well be employed or utilized in or with other harvesters and equipment, including harvesters that employ dual rotor threshing systems and with equipment for other applications, or with other types of fans such as paddle or vane type fans, or with other equipment or in other circumstances and situations, consistent with the principles and teachings expounded.

For convenience of reference and understanding in the following discussions, and with respect to the various drawings and their descriptions, the point of reference for the use of various terms that are hereafter employed, including "left", "right", "forward", "rearward", "front", "back", "top", and "bottom", should generally be considered to be taken from a point at the rear of the combine facing in its normal direction of travel, unless it is clear from the discussion and context that a different point of reference is appropriate. Any use of such terms should therefore be considered exemplary and should not be construed as limiting or introducing limitations.

Moreover, inasmuch as various components and features of harvesters and fan assemblies are of well-known design, construction, and operation to those skilled in the art, the details of such components and their operations will not generally be discussed in significant detail unless considered of pertinence to the present invention or desirable for purposes of better understanding.

Figure 1:
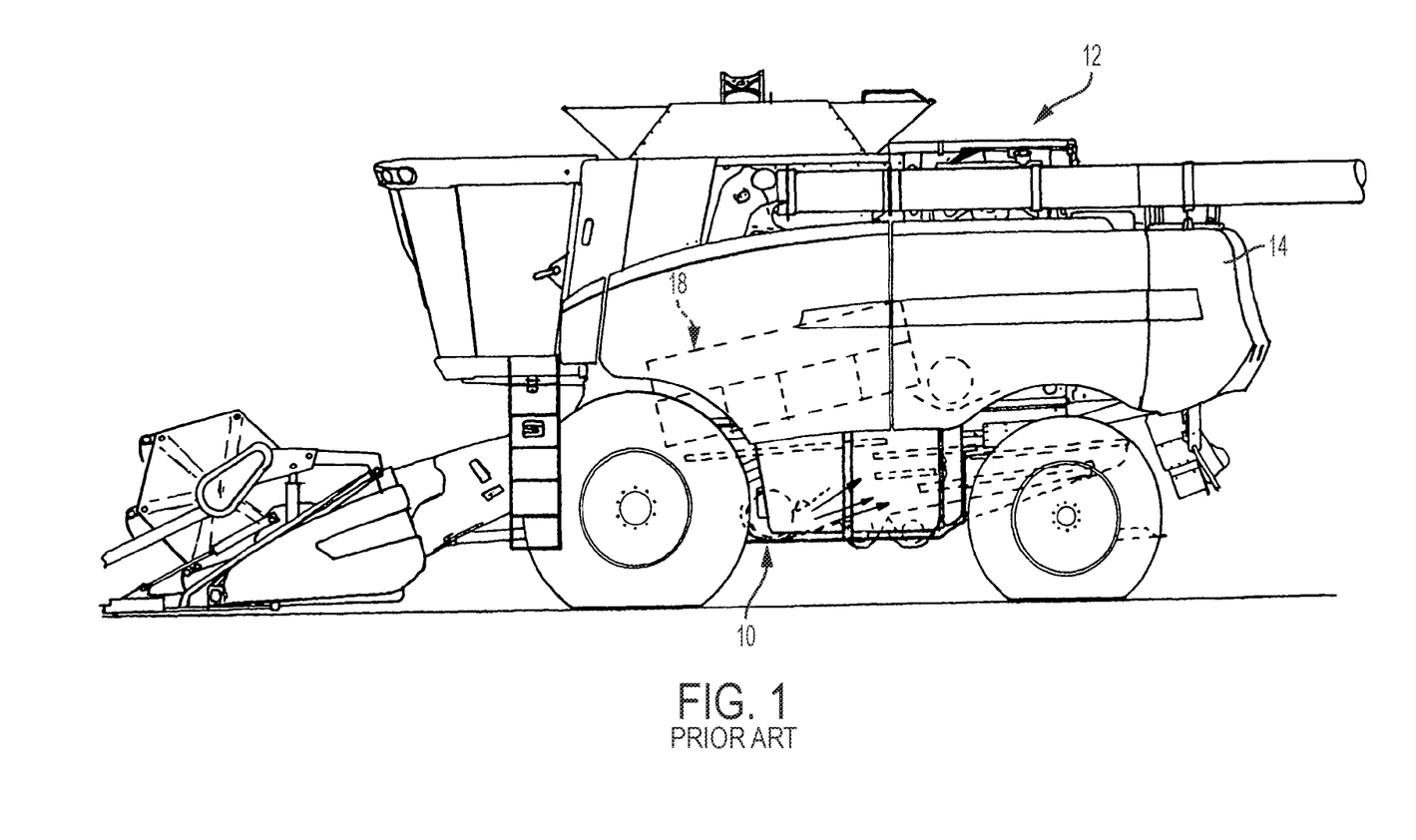
FIG. 1 a left side view of a conventional combine harvester, in which a transverse fan assembly is installed in conjunction with a cleaning system.
Figure 2:
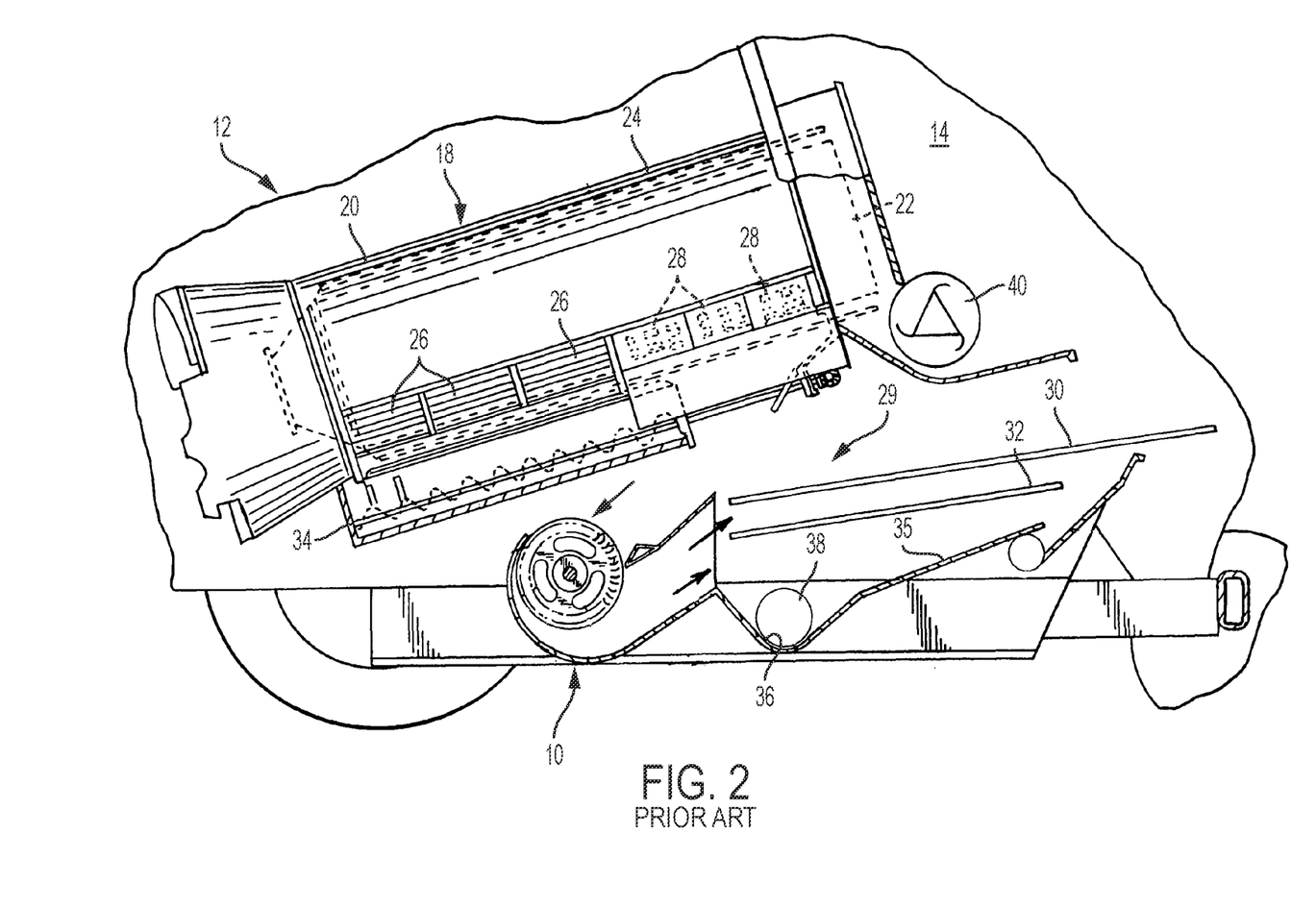
FIG. 2 is a partial cross-sectional view of a portion of the combine harvester of FIG. 1.

FIGS. 1 and 2, which are reproduced from U.S. Pat. No. 8,221,064, identify the general location of and depict a conventional transverse fan assembly 10 arranged in operable combination with a typical, conventional, self-propelled agricultural combine harvester 12 of the axial-flow type wherein crop material is threshed and separated while it is advanced by and along a generally longitudinally arranged rotor.

As is well known in the art, and as is better illustrated in FIG. 2, a threshing apparatus 18 of the combine harvester 12 includes a rotor assembly 20, including a relatively large diameter rotor 22 that is mounted within a threshing cage 24. Disposed about the cage 24 is a system of concaves 26 and separating grates 28 which, through the action of the rotor 22 and centrifugal force, act to separate grain material from other crop residue that is too large to pass through the concaves 26 and grates 28, sometimes hereafter referred to as straw.

The threshed grain material is delivered to a cleaning system 29 that includes a pair of vertically spaced apart cleaning sieves 30 and 32 while the straw is propelled rearwardly through the rotor assembly 20 where a conventional beater 40 acts upon the crop residue discharged from the rotor assembly 20. Beater 40 propels the crop residue from the rear of the rotor assembly 20 and throws it back for broad discharge from the rear end of the combine.

As may be observed from FIG. 2, an auger 34 beneath the threshing apparatus 18 moves the threshed grain material onto the cleaning sieves 30 and 32. The sieves form part of the cleaning system 29 and are mounted for oscillation to separate grain from other larger pieces of threshed crop material. As the sieves 30 and 32 are vibrated or oscillated, the grain falls through the sieves 30 and 32 to an underlying clean grain pan 35 and into a clean grain trough or collector 36. An auger 38 directs the grain from the clean grain trough 36 into a hopper or grain bin (not shown) often housed generally directly behind the cab 12 (FIG. 1) within combine harvester body 14.

The threshed grain material that is too large to fall through the sieves 30 and 32 forms a relatively large crop mat or veil extending across substantially the entire sieve construction, as fan assembly 10 provides air that is blown upwardly and rearwardly, as denoted by the arrows, through sieves 30 and 32. Such air flow acts to blow lighter, non-grain elements, sometimes referred to as chaff, away from the crop mat remaining on the sieves 30 and 32 towards the rear of the harvester, where such chaff is handled in conventional and well-known manners.

Figure 3A:
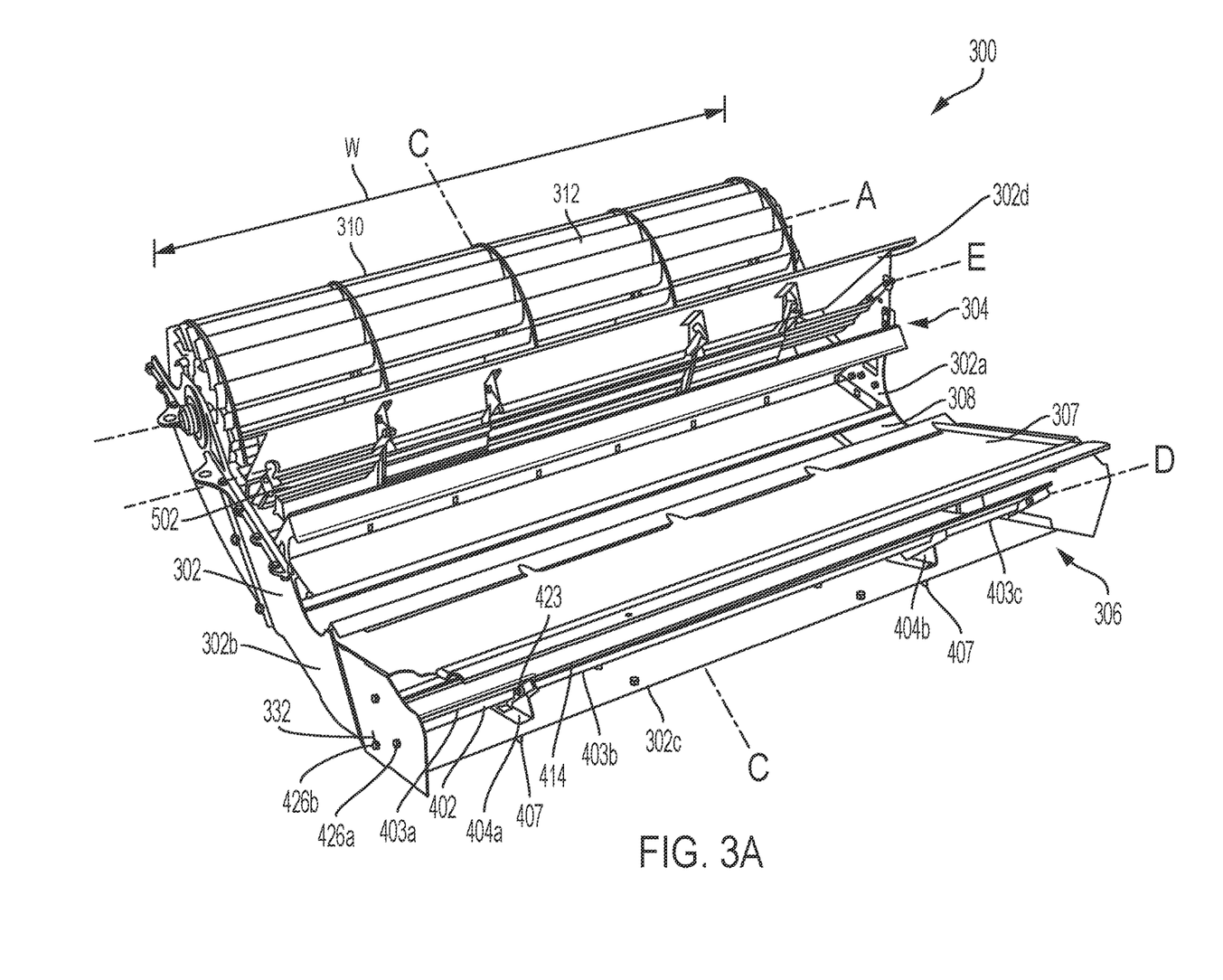
FIG. 3A depicts a rear isometric view of a fan assembly, in accordance with an exemplary embodiment of the present invention.
Figure 3B:
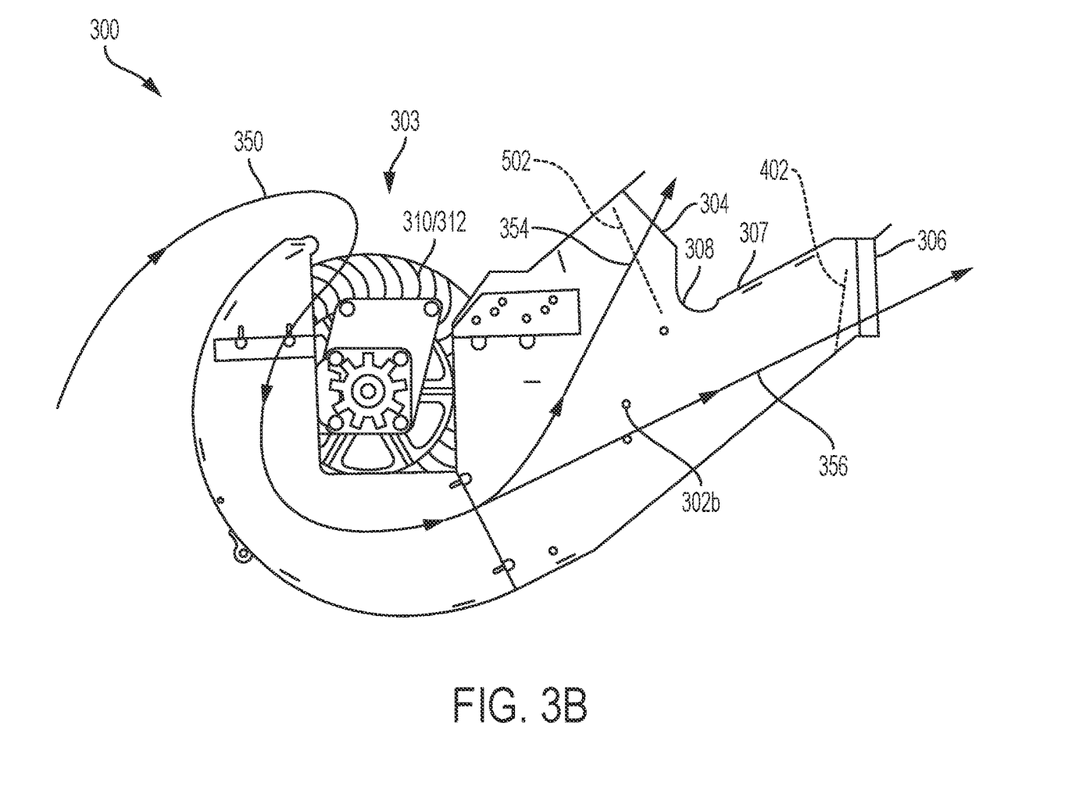
FIG. 3B depicts a side elevation view of the fan assembly of FIG. 3A.

Turning now to FIGS. 3A and 3B, there is illustrated a transverse fan assembly 300, in accordance with an exemplary embodiment of the present invention. The fan assembly 300 is intended to replace the fan assembly 10 of FIGS. 1 and 2 in the combine harvester. The fan assembly 300 includes a housing 302 having a series of walls or panels that are mounted together to form an interconnected housing. The housing 302 generally includes, among other features, two side walls 302a and 302b defining an exterior width dimension 'W', a bottom cover 302c interconnecting the side walls 302a and 302b, and a top wall 302d. The individual walls of the housing 302 may be composed of sheet metal, for example.

The fan housing 302 includes an air inlet 303 at its top end. Unlike the fan assembly 10 of FIG. 2, the fan assembly 300 includes two exhaust openings 304 and 306 through which air is exhausted. Air flow 350 through the fan assembly 300 is shown in FIG. 3B. In operation, the upper opening 304 directs air 354 onto the upper sieve 30 (see FIG. 2), whereas the lower opening 306 directs air 356 onto the lower sieve 32 of the harvester. One or more panels 307 connect the side walls 302a and 302b to form a top of the lower outlet exhaust opening 306. Behind the panels 307 is disposed a curved divider 308 positioned between the exhaust openings 304 and 306. The curved divider 308 serves to separate the air flow 350 into air flow 354 and air flow 356.

The fan assembly 300 includes a single, unitary rotor 310 spanning the entire width W of the fan assembly 300. The rotor 310 includes a series of blades 312 for drawing air through the housing 302 from the inlet 303 to the outlets openings 304 and 306. The rotor 310 may be driven by a single drive.

The fan assembly 300 includes deflectors 502 and 402 positioned in the outlet opening 304 and 306, respectively. The deflector 402, which is positioned at, near or adjacent to the outlet opening 306, controls the volume and uniformity of air that passes through outlet opening 306. Similarly, the deflector 502, which is positioned at, near or adjacent to the outlet opening 304, controls the volume and uniformity of air that passes through outlet opening 304.

The deflectors 402 and 502 each include a number of interconnected panels (or flaps) 403 and 503, respectively, that are manually movable (e.g., pivotable) between open and closed positions. The "open" position may not be completely open, and the "closed" position may not be completely closed. Thus, it may be considered that the deflectors 402 and 502 are movable between positions having different restrictions to air flow (i.e., one position having a greater restriction to air flow than the other position). Alternatively, the panels 403 and 503 may be connected to individual actuators or motors, for example, that are configured to move the deflector panels in an automated fashion upon receiving instructions from an end user via a controller.

The panels 403 of the deflector 402 about axis D can be individually adjusted to (i) either uniformly or non-uniformly deliver the flow of air across the width W of the lower outlet opening 306, (ii) divert air to the upper outlet opening 304, and/or (iii) introduce a greater proportion of the air to the lower outlet opening 306. Similarly, the panels 503a-503e of the deflector 502 can be individually adjusted about axis E to (i) uniformly deliver the flow of air across the width W of the upper outlet opening 304, (ii) divert air to the lower outlet opening 306, and/or (iii) introduce a greater proportion of the air to the upper outlet opening 304. It should be understood that the panels 403 and 503 of the deflectors 402 and 502, respectively, do not normally move during operation of the combine.

Turning now to FIGS. 3A and 4A-4D, deflector 402 is an assembly comprising multiple panels 403a-403c (referred to either individually or collectively as panel(s) 403) that are connected together by brackets 404a and 404b (referred to either individually or collectively as bracket(s) 404) and fasteners. Each panel 403 includes a substantially flat body having a top surface 410, a bottom surface, two side surfaces, a leading edge 412 (i.e., the edge that is upstream with respect to the flow of air), and a trailing edge 414 that is downstream of the leading edge 412. The edges 412 and 414 may be linear and straight, as shown. Alternatively, the edges could be curved, for example.

Figure 4A:
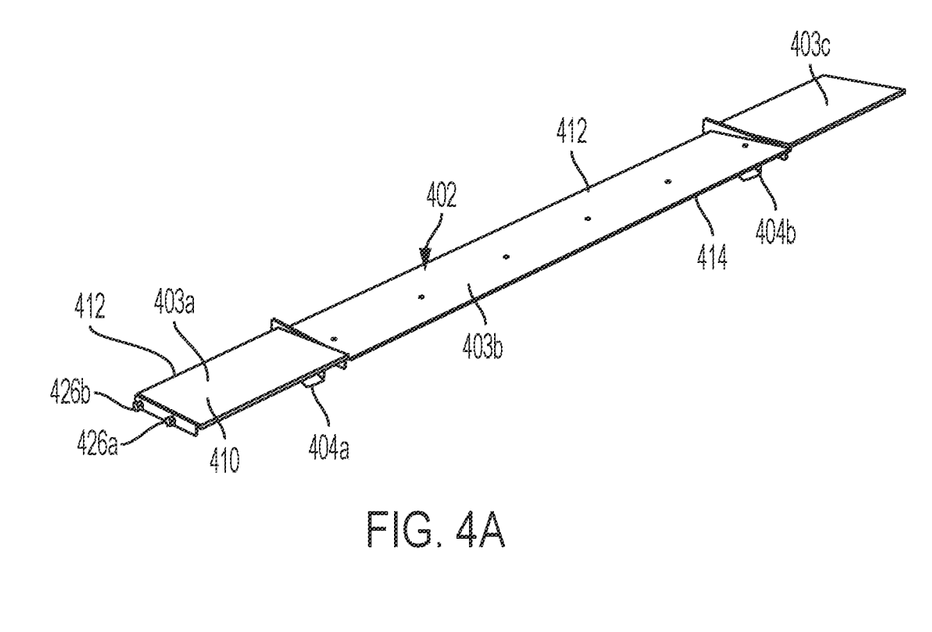
FIGS. 4A and 4B are front isometric views of a lower deflector of the fan assembly of FIGS. 3A and 3B.
Figure 4B:
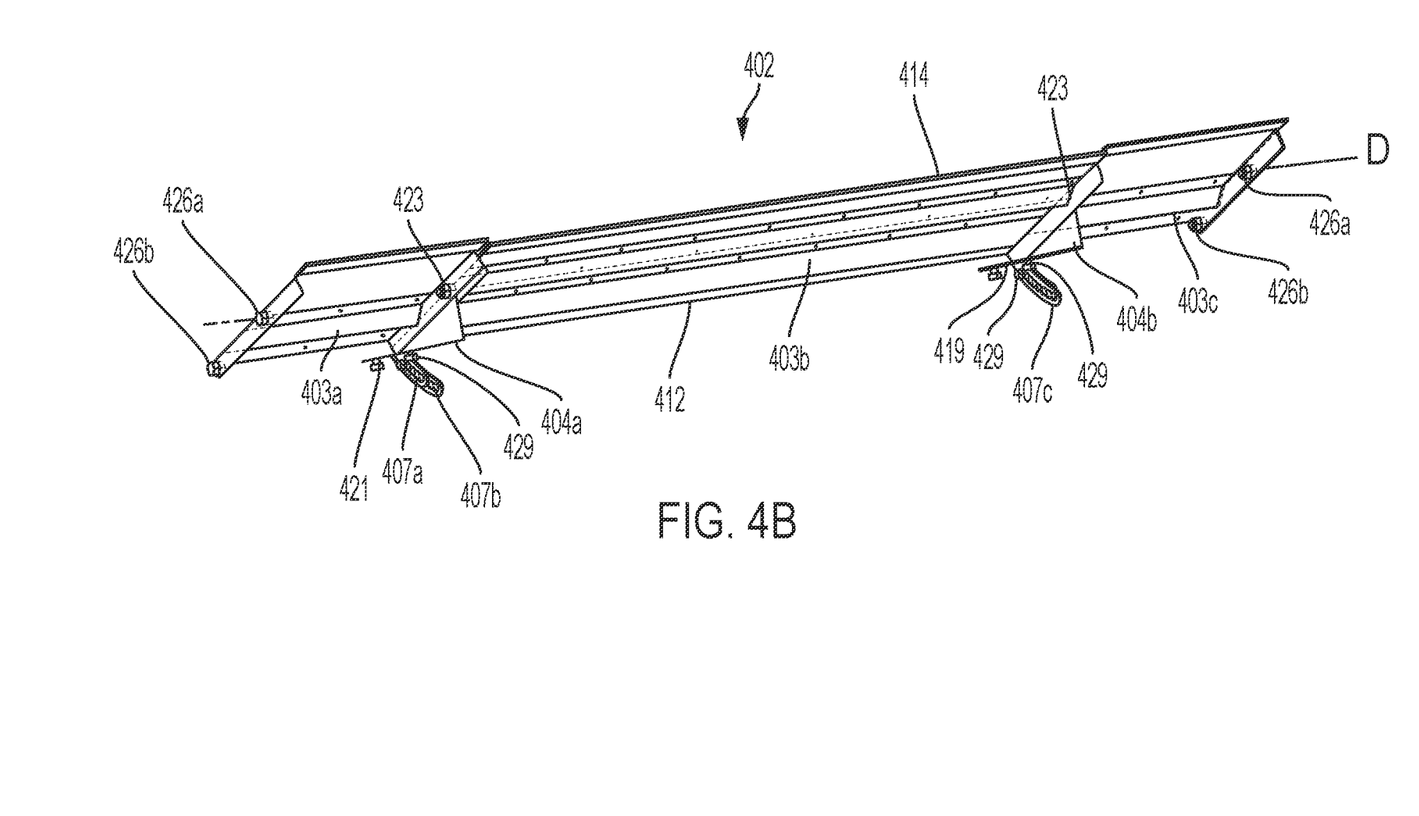

The right side of the panel 403a includes an attachment leg 407a. The left and right sides of the panel 403b include attachment legs 407b and 407c, respectively. The left side of the panel 403c includes an attachment leg (not shown). The attachment legs 407a-407c may be referred to either individually or collectively as attachment leg(s) 407. Each attachment leg 407 is a curved member extending from the leading edge 412 of its respective panel 403 that includes a plurality of openings 409 that are each configured for receiving a fastener 429. The fastener 429 can be mounted in any one of the openings 409 for setting a rotational position of the panel 403.

Figure 4C:
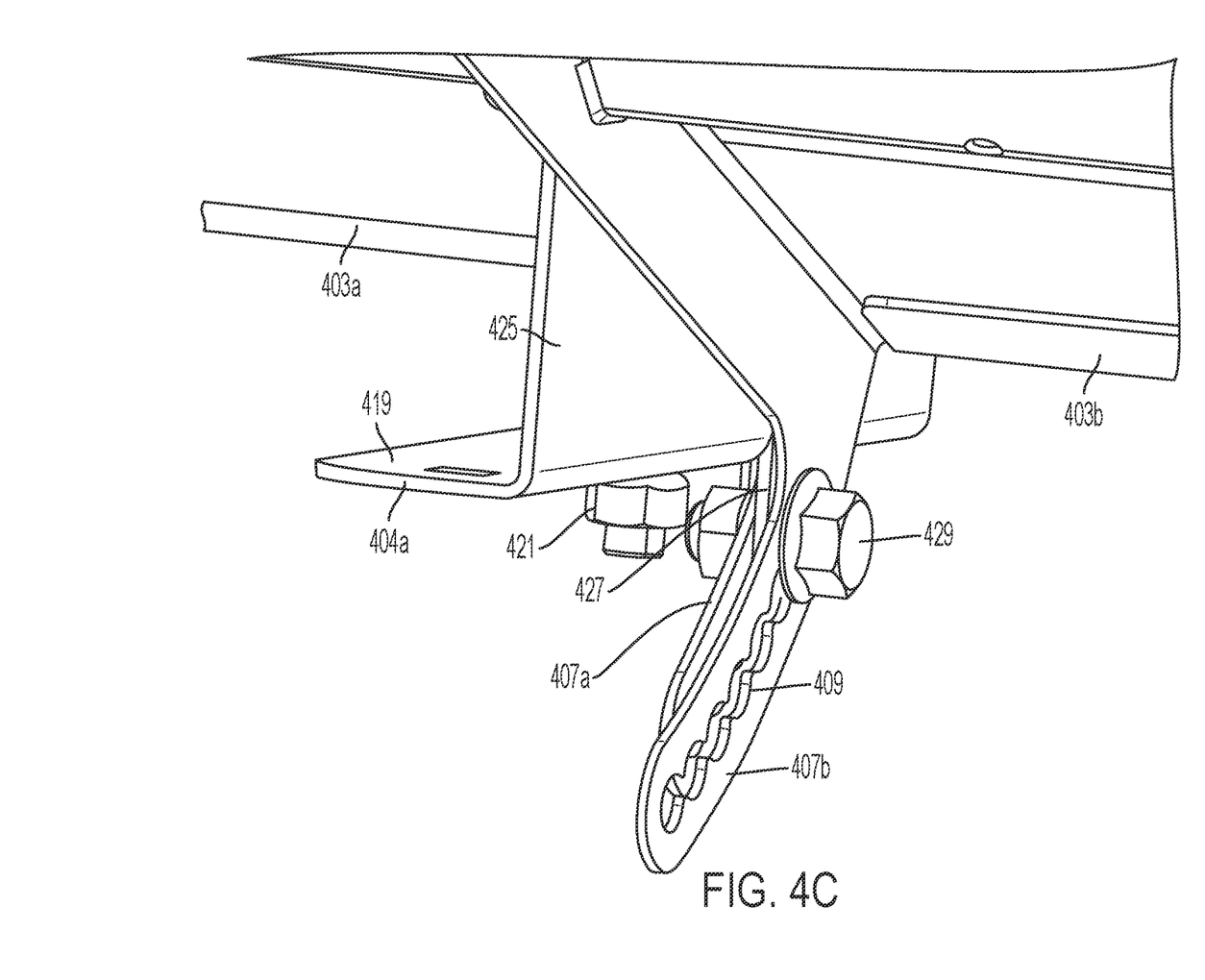
FIG. 4C is a front isometric detailed view of the lower deflector of FIG. 4B.
Figure 4D:
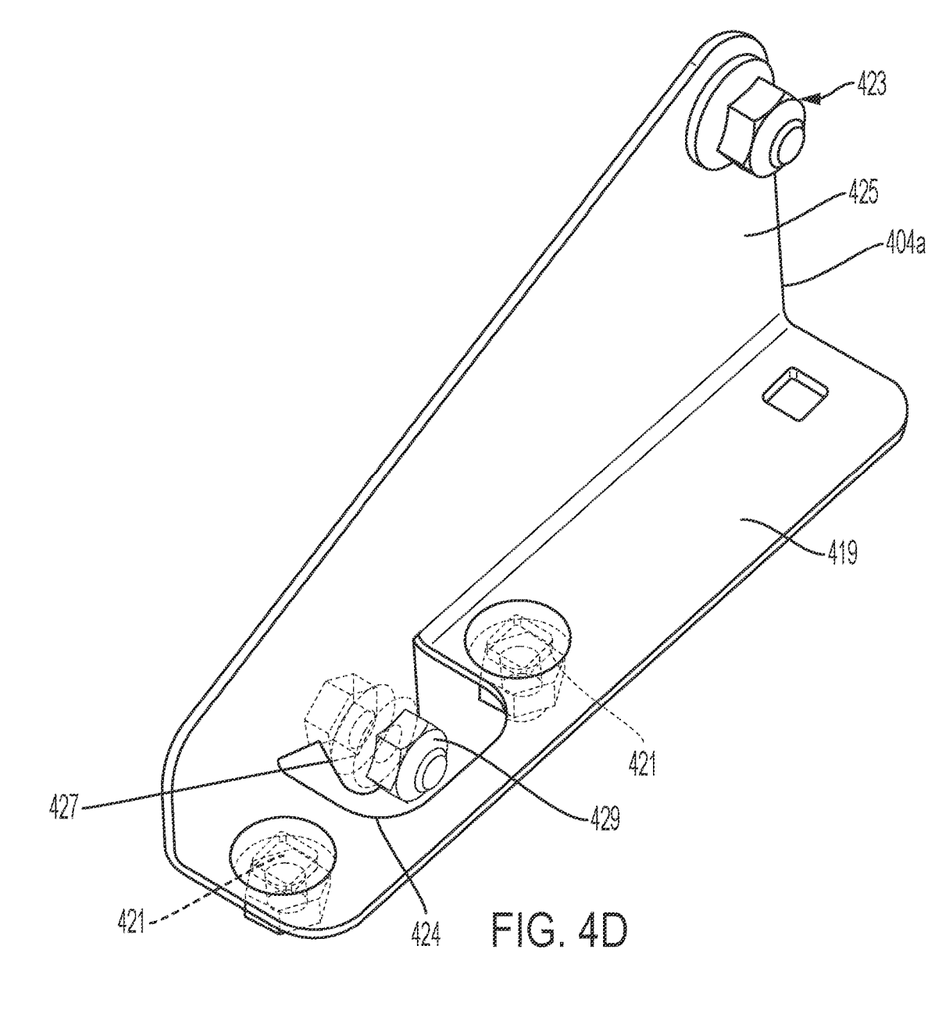
FIG. 4D is a rear isometric view of a bracket of the lower deflector of FIG. 4C.

As best shown in FIG. 4D, the brackets 404a and 404b are substantially identical, and each bracket 404a and 404b is (optionally) a bent sheet metal member. Each bracket 404 includes a mounting surface 419 for mounting to the bottom surface 302c of the fan housing 302 by fasteners 421. A triangular shaped wall 425 depends upwardly from the mounting surface 419. A fastener 423 is mounted through an opening in the triangular shaped wall 425 for joining the bracket 404 to two adjacent panels 403. Each bracket 404 includes an elongated opening 424 that is defined on the mounting surface 419. A tab 427 extends in a vertical direction from the wall 425 to an elevation beneath the opening 424. A fastener 429 is mounted through a hole in the tab 427. The opening 424 is aligned with an opening in the bottom surface 302c of the fan housing 302 to enable positional adjustment of the panels 403, as will be described later.

Described hereinafter is the attachment of the individual panels 403 and brackets 404 of the deflector 402. Referring now to FIG. 4B, the left side of the panel 403a is pivotably connected to the side wall 302b by fastener 426b, which is movably positioned within a slot or channel 332 that is formed in a side wall 302b (FIG. 3A). The fastener 426b may be fixed in place within the channel 332 once the panel 403a is pivoted (or otherwise moved) to the preferred position in order to prevent movement of the panel 403a during regular operation of the combine. A second fastener 426a on the left side of the panel 403 is fixedly mounted to a hole in side wall 302b.

As best shown in FIGS. 4B and 4C, the top end of the right side of the panel 403a is mounted to bracket 404a by fastener 423. Fastener 423 is also mounted to the stationary bracket 404a, as well as to a hole in the left side of the adjoining center panel 403b. The leg 407a of the panel 403a, which passes through the opening 424 of the bracket 404a and an opening in the base wall 302c of the housing 302, is adjustably mounted to the tab 427 of the bracket 404a as well as the leg 407b of the panel 403b by a fastener 429. The operator passes the fastener 429 through the appropriate opening 409 in the legs 407a and 407b so as to position the panels 403a and 403b in their desired rotational positions.

Referring now to the remaining panels 403, the left side of the center panel 403b is mounted to the bracket 404a and the panel 403a, as was described above. The right side of the center panel 403b is mounted to the bracket 404b and the panel 403c in the same manner as the left side of the center panel 403b. The panel 403c is pivotably connected to the side wall 302a, the bracket 404b, and the center panel 403b in the same manner as was described above with reference to panel 403a.

The rotational position of each of the individual panels 403a-403c about the axis of rotation D can be adjusted using fasteners 429 and 426b. Axis D passes through the axis of fasteners 426a and 423. Axis D is also orthogonal to the center line axis C, and runs parallel to the width W of the fan housing 302.

Turning now to FIGS. 3A and 5A-5C, a fastening system similar to the fastening system described above with respect to deflector 402 is applicable to the deflector 502. The fastening system for the deflector 502, which includes five brackets 505a-505e (referred to either collectively or individually as bracket(s) 505), provides selective and adjustable pivoting (or movement generally) of the individual panels 503a-503e (referred to either collectively or individually as panel(s) 503) of the deflector 502. The stationary brackets 505 are fixed to the top wall 302d of the housing 302.

Figure 5A:
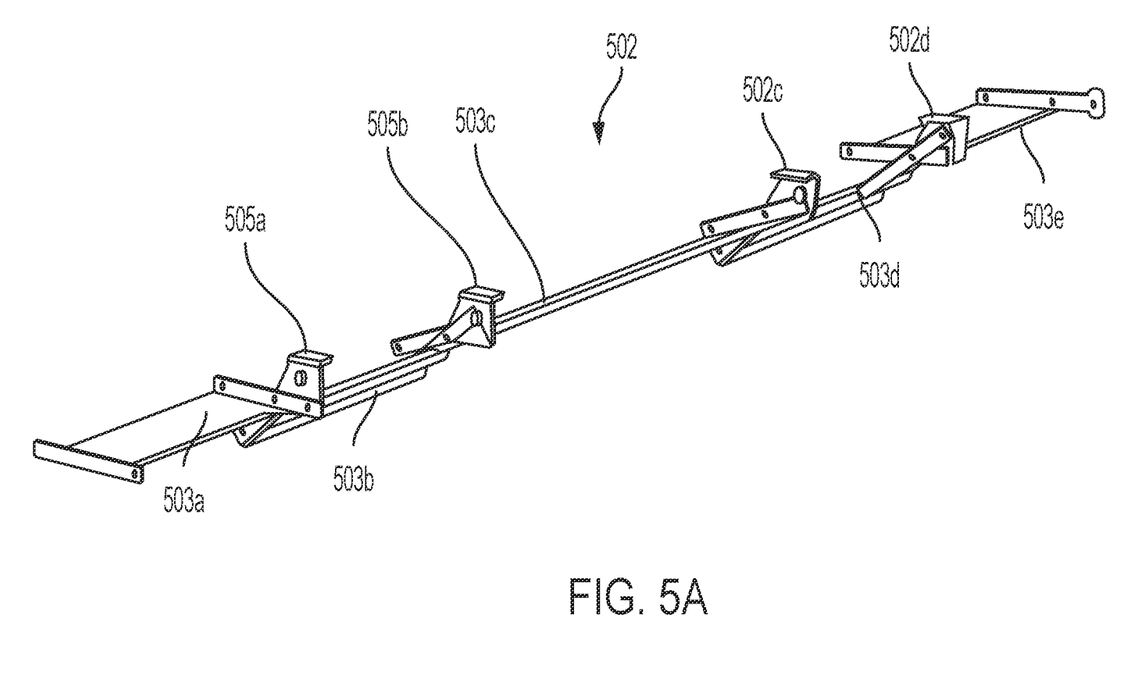
FIGS. 5A-5C are isometric views of an upper deflector of the fan assembly of FIGS. 3A and 3B.
Figure 5B:
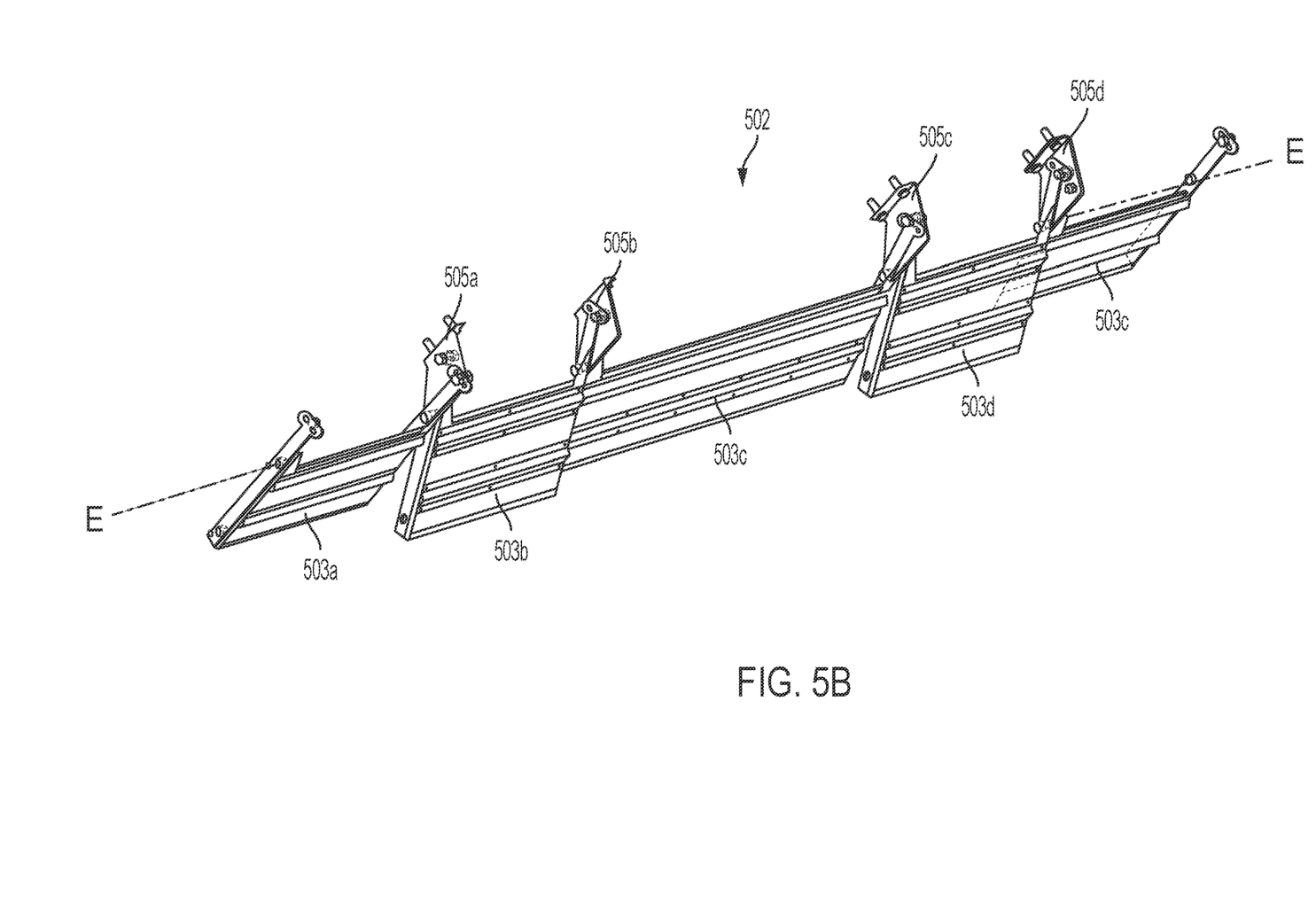
Figure 5C:
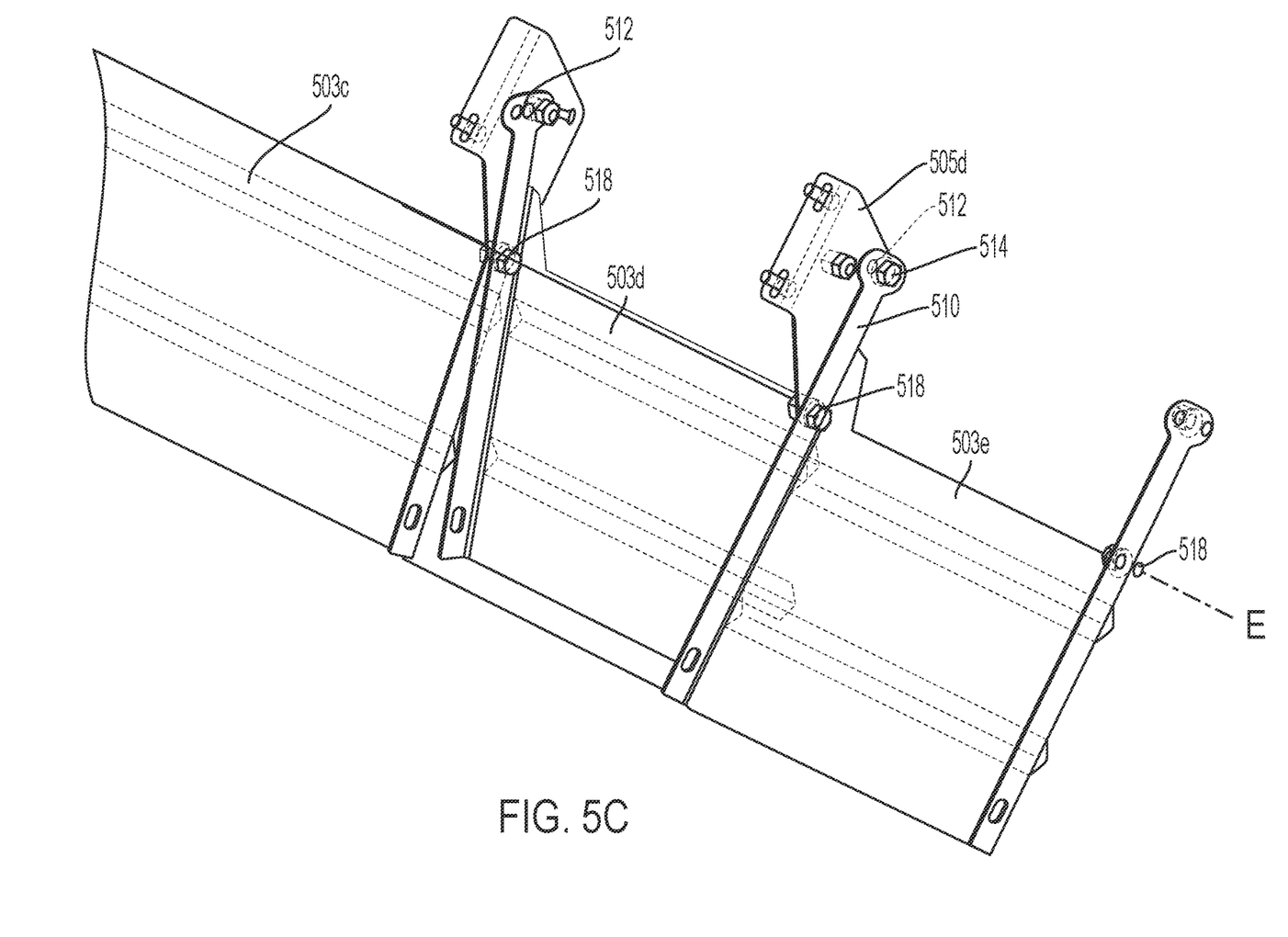

As best shown in FIG. 5C, unlike the panels 403 of the deflector 402, however, each panel 503 of the deflector 502 includes a straight T-shaped leg 510 having a series of openings 512 at its head for receiving a fastener 514. Using one of the openings 512, the fasteners 514 are used to selectively mount each panel 503 to a stationary bracket 505 in a desired rotational position about axis E. Axis E is defined through bolts 518 that connect together the panels 503 and brackets 505. Axis E is oriented parallel to axis D.

Figure 3C:
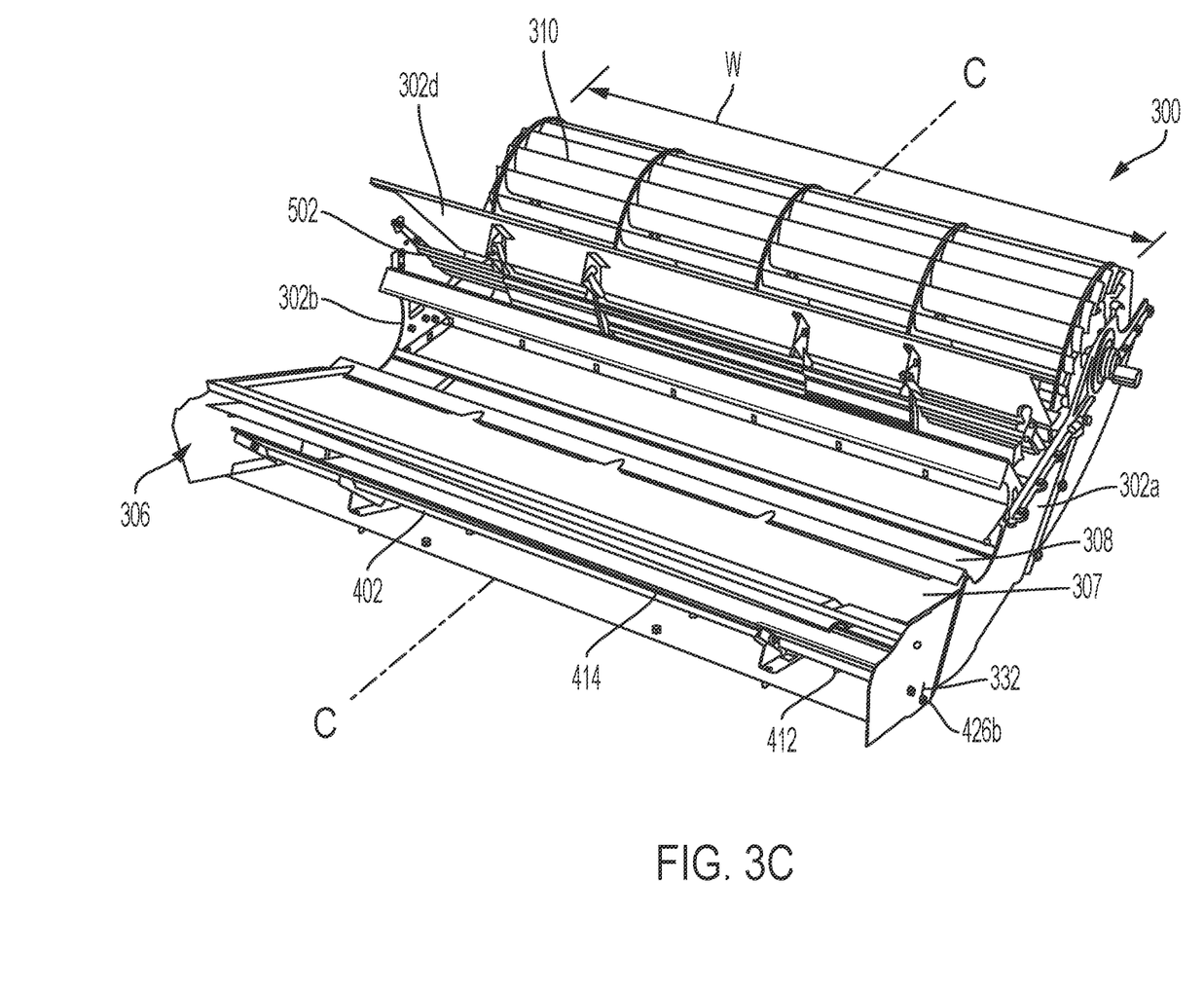
FIGS. 3C and 3D depict additional isometric views of the fan assembly of FIG. 3A.
Figure 3D:
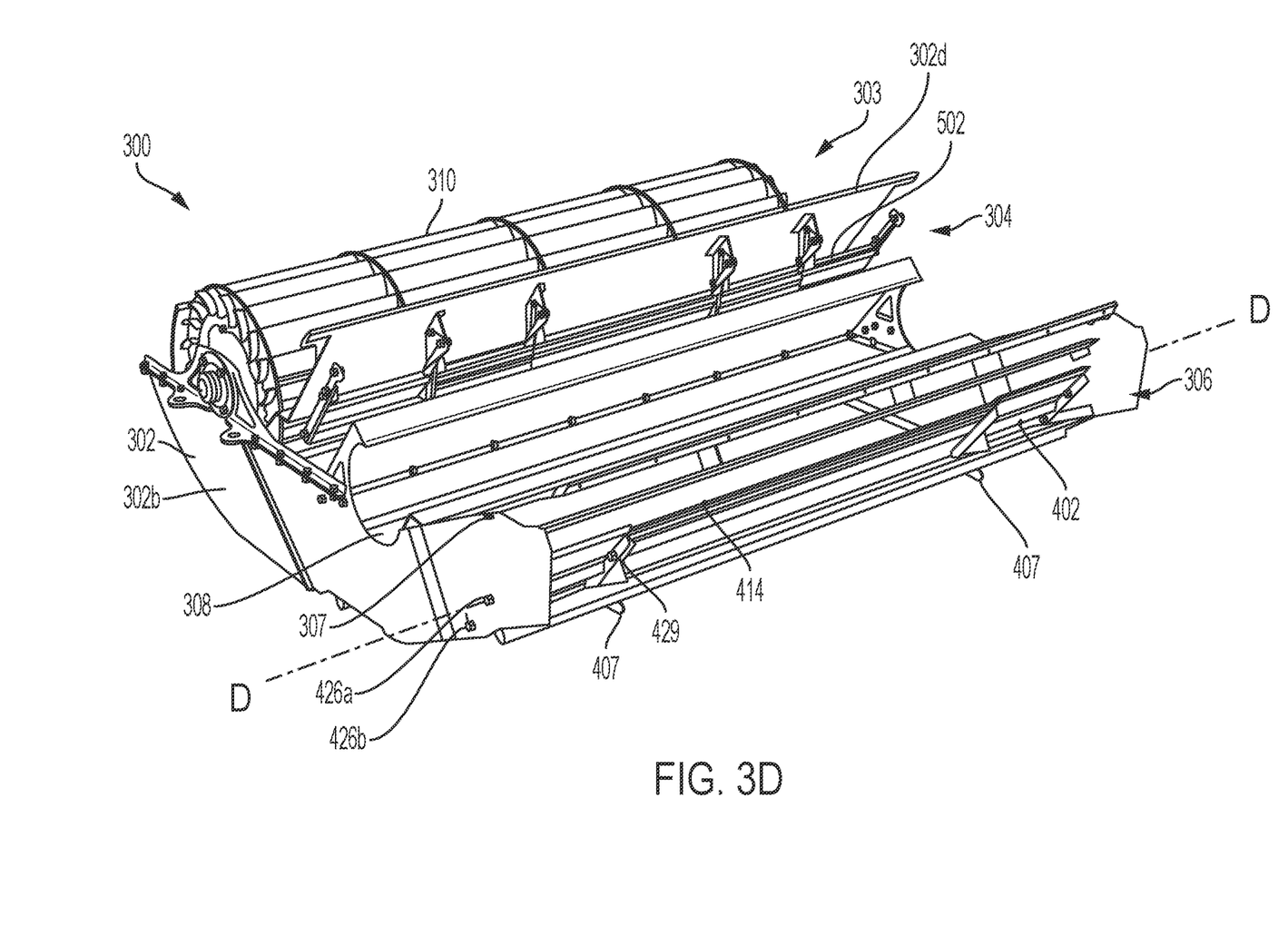

As noted above in the Background section, one problem with long and wide transverse fans, such as the fan assembly 10 of the Prior Art, is that the air blowing through the fan housing will converge towards the center of the fan housing (i.e., towards axis C in FIG. 3C) and create a significantly stronger airstream in the center of the fan housing as compared with the sides 302a and 302b of the fan housing 302 (see FIG. 3C). In other words, the air can be unevenly distributed along the width dimension 'W' of the fan (see FIG. 3C). To address this problem, the panels of the deflectors 402 and 502 are individually adjustable for directing at least a portion of the air flow in the respective passages in a direction away from the center axis 'C' (see FIG. 3C) of the fan housing 300 and towards the sides 302a and 302b of the fan housing 300.

More generally, as noted above, the panels of the deflectors 402 and 502 are configured to (i) either uniformly or non-uniformly (as desired) deliver the flow of air across the width W of a respective outlet opening 304 or 306, and/or (ii) divert air between the lower and upper outlet openings 304 and 306.

Figure 6:
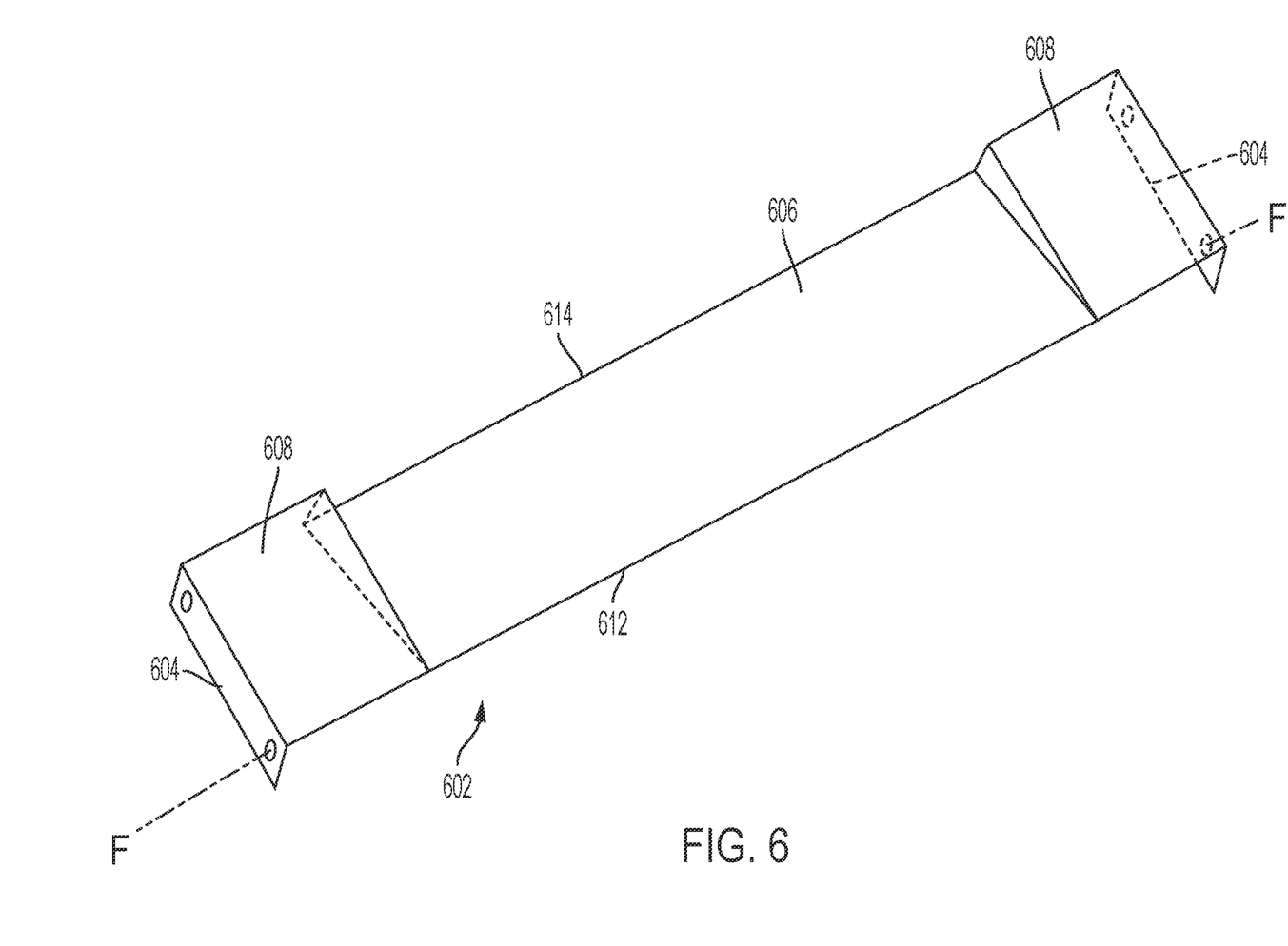
FIG. 6 depicts an isometric view of a lower deflector, according to an alternative embodiment.

As best shown in FIG. 6, as an alternative to the multi-panel deflectors described above, that figure depicts a lower deflector 602 for use with the fan housing 300 (in lieu of lower deflector 402). The deflector 602 comprise a single unitized and monolithic body that extends from one side wall 302a/302b of the housing 302 to the other side wall 302a/302b of the housing 302. The body may be composed of sheetmetal, for example, having multiple bends. The deflector 602 is mounted to the side walls of the housing 302 such that the deflector 602 is configured to pivot about axis F. Fasteners (not shown) may be used to mount deflector in a variety of rotational positions about axis F.

Deflector 602 comprises opposing side surfaces 604 that are pivotably connected to the sides 302a and 302b of the housing 300, as was described above with respect to deflector 402. Deflector 602 includes side portions 608, a protruding central portion 606 extending between the side portions 608, a leading edge 612 and a trailing edge 614. The portions 606 and 608 are aligned at the leading edge 612, however, at the trailing edge 614, the central portion 606 extends further into the outlet opening 306 (and toward panel 307 of housing 302) than the side portions 608. The purpose of the protruding central portion 606 is to direct air toward the sides 302a/b of the housing 302, thereby resulting in a more uniform air distribution across the width W of the housing 302. Although not shown, a similar unitized deflector may be provided as an upper deflector in lieu of deflector 502.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fan assembly for a cleaning system of a combine harvester comprising:
    a housing comprising a plurality of interconnected walls, the interconnected walls defining at least one inlet opening through which air is delivered into the housing, and at least one outlet opening through which air is exhausted from the housing;
    a deflector positioned either at or adjacent the outlet opening, the deflector being configured to affect a flow of air across a width dimension W of the outlet opening, wherein the deflector comprises a plurality of panels that are connected together, wherein each panel is individually pivotable with respect to the other panels of the plurality of panels prior to being fixed to the other panels, wherein each panel includes a wall for directing airflow and flanges extending orthogonally from opposing sides of the wall, wherein a plurality of openings are formed in at least one of the flanges; and
    a fastener that passes through the openings in the flanges of two panels of the plurality of panels thereby fixing together the two panels such that the two panels rotate together.

2. The fan assembly of claim 1, further comprising a fan mounted to the housing that is configured to distribute air from the inlet opening to the outlet opening.

3. The fan assembly of claim 1, wherein the deflector extends across the width dimension W of the outlet opening.

4. The fan assembly of claim 1, wherein the plurality of openings are arranged along a curved path.

5. The fan assembly of claim 1, wherein adjacent panels of the plurality of panels are connected to a stationary bracket, and the stationary bracket is mounted to a wall of the housing.

6. The fan assembly of claim 1, wherein each panel is pivotable about a common axis that extends along the width dimension of the fan assembly prior to being fixed in a stationary position.

7. The fan assembly of claim 1, wherein the plurality of panels comprise at least three panels including a central panel positioned between two side panels, and the central panel of the at least three panels is configured to direct air toward the side panels of the at least three panels.

8. The fan assembly of claim 1, wherein the housing comprises a second outlet opening and a second deflector that is positioned either at or adjacent the second outlet opening, the second deflector being configured to affect a flow of air across a width dimension W of the second outlet opening.

9. The fan assembly of claim 8, wherein the second deflector comprises a plurality of panels that are connected together, wherein each panel is individually pivotable with respect to the other panels of the plurality of panels prior to being fixed in a stationary position.

10. The fan assembly of claim 1, wherein each panel comprises a unitary body that extends across a portion of the width dimension W of the outlet opening.

11. The fan assembly of claim 1, wherein the housing includes at least two exterior side walls together defining the width dimension W of the outlet opening.

12. The fan assembly of claim 11, wherein the deflector is pivotably connected to the at least two exterior side walls.

13. The fan assembly of claim 1, wherein the deflector spans an entirety of the width dimension W of the outlet opening.

14. The fan assembly of claim 1, wherein the deflector is configured to be fixed at a plurality of rotated positions.

15. A combine harvester comprising the fan assembly of claim 1.

16. A fan assembly for a cleaning system of a combine harvester comprising:
    a housing comprising a plurality of interconnected walls, the interconnected walls defining at least one inlet opening through which air is delivered into the housing, and first and second outlet openings through which air is exhausted from the housing;
    a first deflector positioned either at or adjacent the first outlet opening, the deflector being configured to affect a flow of air across a width dimension W of the first outlet opening; and
    a second deflector positioned either at or adjacent the second outlet opening, the second deflector being configured to affect a flow of air across a width dimension W of the second outlet opening,
    wherein for each deflector, the deflector comprises a plurality of panels that are connected together, wherein each panel of the deflector is individually pivotable with respect to the other panels of the plurality of panels prior to being fixed in a stationary position, wherein each panel includes a wall for directing airflow and flanges extending orthogonally from opposing sides of the wall, wherein a plurality of openings are formed in at least one of the flanges,
    wherein for each deflector a fastener passes through the openings in the flanges of two panels of the plurality of panels of the deflector, thereby fixing together the two panels such that the two panels rotate together.

17. The fan assembly of claim 16, further comprising a fan mounted to the housing that is configured to distribute air from the inlet opening to the outlet openings.

18. The fan assembly of claim 16, wherein each deflector extends across the width dimension W of the respective outlet opening.

19. The fan assembly of claim 16, wherein the plurality of openings are arranged along a curved path.

20. The fan assembly of claim 16, wherein each deflector is configured to be fixed at a plurality of rotated positions.

* * * * *